(12) United States Patent
Townsend et al.

(10) Patent No.: US 12,129,199 B2
(45) Date of Patent: Oct. 29, 2024

(54) METHOD AND SYSTEM FOR MANUFACTURING GLASS

(71) Applicant: Owens-Brockway Glass Container Inc., Perrysburg, OH (US)

(72) Inventors: Casey Townsend, Perrysburg, OH (US); Carol Click, Corning, NY (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 443 days.

(21) Appl. No.: 17/693,524

(22) Filed: Mar. 14, 2022

(65) Prior Publication Data

US 2023/0286849 A1    Sep. 14, 2023

(51) Int. Cl.
   *C03B 5/225*    (2006.01)
   *C03B 5/173*    (2006.01)
   *C03B 5/235*    (2006.01)
   *C03B 5/24*     (2006.01)

(52) U.S. Cl.
   CPC .............. *C03B 5/24* (2013.01); *C03B 5/173* (2013.01); *C03B 5/225* (2013.01); *C03B 5/235* (2013.01)

(58) Field of Classification Search
   CPC ....................................................... C03B 5/173
   See application file for complete search history.

(56) References Cited

U.S. PATENT DOCUMENTS

| | | |
|---|---|---|
| 2,923,635 A | 2/1960 | Beck, Sr. et al. |
| 2,979,865 A * | 4/1961 | Rough .................... C03B 5/173 501/72 |
| 3,057,175 A | 10/1962 | Rough et al. |
| 3,326,702 A | 6/1967 | Babcock |
| 3,330,638 A | 7/1967 | Brown |
| 3,364,041 A | 1/1968 | Swain, Jr. et al. |
| 3,445,216 A * | 5/1969 | Keefer .................... C03B 5/173 65/145 |
| 3,463,626 A * | 8/1969 | Le Blanc ................ C03B 5/173 501/71 |
| 3,463,627 A * | 8/1969 | Leblanc .................. C03C 1/105 65/61 |
| 3,498,806 A | 3/1970 | Hammer et al. |
| 3,545,952 A | 12/1970 | Conrad |
| 3,627,504 A | 12/1971 | Johnson et al. |
| 3,869,270 A | 3/1975 | Brungs et al. |
| 3,915,684 A | 10/1975 | Schornhorst |
| 4,004,902 A * | 1/1977 | Pieper .................... C03B 5/2252 65/135.4 |
| 4,312,953 A | 1/1982 | Mills et al. |
| 5,588,978 A | 12/1996 | Argent et al. |
| 7,137,277 B1 | 11/2006 | Romer et al. |

(Continued)

OTHER PUBLICATIONS

PCT Int. Search Report and Written Opinion, Int. Application No. PCT/US2023/014260, Applicant; Owens-Brockway Glass Container Inc., Dated: Jun. 9, 2023.

*Primary Examiner* — Erin Snelting

(57) ABSTRACT

A process for transitioning molten glass in a glass furnace from one color to another color while minimizing the production of out-of-color specification transition glass. During the transition, a compensating agent is introduced into the molten glass to adjust the color of the molten glass being discharged from the furnace so that the discharged molten glass meets a target color specification, which effectively results in acceleration of the furnace color change compared to other conventional methods.

18 Claims, 1 Drawing Sheet

(56) References Cited

U.S. PATENT DOCUMENTS

| | | |
|---|---|---|
| 7,386,997 B2 | 6/2008 | Lehman et al. |
| 2004/0168474 A1 | 9/2004 | Jeanvoine et al. |
| 2006/0070405 A1 | 4/2006 | Jones et al. |
| 2007/0212546 A1 | 9/2007 | Jeanvoine et al. |
| 2013/0239618 A1 | 9/2013 | Ishikawa et al. |
| 2014/0120278 A1 | 5/2014 | Ordway et al. |
| 2021/0246062 A1 | 8/2021 | Vempati et al. |
| 2023/0080532 A1* | 3/2023 | Bhonsle ............... C03B 5/173 65/66 |

* cited by examiner

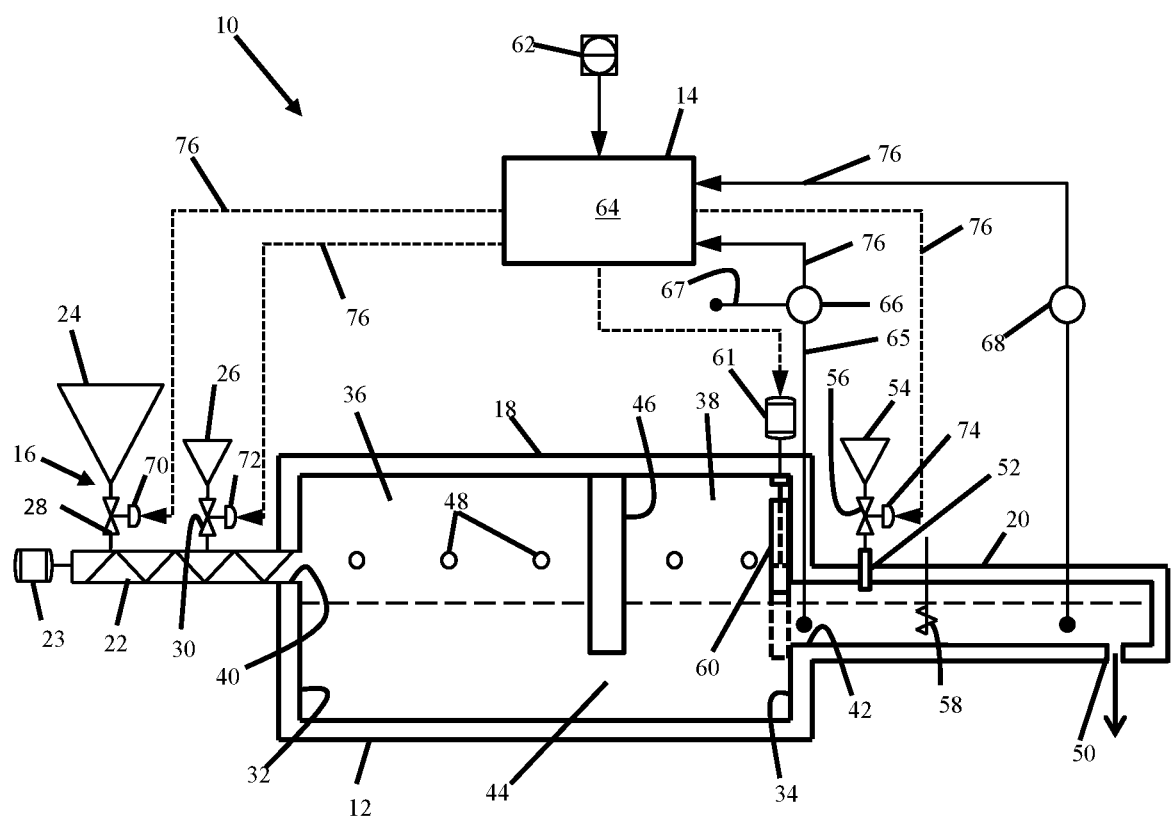

METHOD AND SYSTEM FOR MANUFACTURING GLASS

The present disclosure is directed to a method and a system for manufacturing glass, and, more specifically, for efficiently changing the color of glass in a furnace while, at the same time, minimizing the production of out-of-color specification transition glass.

BACKGROUND

Glass used in the commercial production of glass containers and other articles is conventionally prepared by melting a glass batch, which includes a mixture of solid glass-forming materials, in a melting tank of a continuous glass furnace to produce a volume of molten glass or a glass melt. Additional glass-forming materials are continuously charged into the melting tank, deposited on top of the glass already in the furnace, and gradually melted therein by the continuous application of heat. Molten glass flows through the melting tank of the furnace, from a melting chamber to a refining chamber, and then into a relatively shallow channel known as a forehearth at a working end of the furnace.

Colorant materials may be incorporated into the molten glass in the furnace to impart color to or to decolorize the resulting glass. One method of incorporating colorant materials into molten glass in a continuous glass furnace is referred to as a tank coloration method, which involves mixing the colorant materials with the solid glass-forming materials in the glass batch in the melting tank. Alternatively, a forehearth coloration method may be used, wherein a colorant enriched material or color concentrate, such as a frit glass or pressed pellets, is mixed into the molten glass flowing through the forehearth. The tank coloration method is considered to be the most economical way to produce colored glass on a continuous basis due to the additional time and energy required to prepare the colorant enriched material and to homogenously mix it into the molten glass in the forehearth prior to discharge.

However, when the tank coloration method is employed, challenges arise during a full furnace color change. In particular, carrying out a full furnace color change in a continuous glass furnace involves transitioning and flushing the furnace with glass of the newly desired color, which results in a lengthy out of production period and the generation of large quantities of out-of-color specification glass that may be unsalable. Throughout the present specification, when a glass is defined as having a "color," it should be noted that a color can also include a glass that to the human eye is a colorless or nearly colorless glass, typically called "flint glass" in the glass and container industry.

SUMMARY

A method and a system for effecting a full furnace color change in a continuous glass furnace is disclosed that reduces the duration of production down time and the quantity of out-of-color specification glass produced during the color change, as compared to conventional color change techniques. The present disclosure embodies a number of aspects that can be implemented separately from or in combination with each other.

A method for manufacturing glass, in accordance with one aspect of the disclosure, includes melting a glass batch in a continuous glass furnace to produce molten glass having a first glass composition and a first color. The first color associated with the first glass composition is defined by a first color specification. The molten glass in the furnace is transitioned from the first glass composition having the first color to a second glass composition having a second color that is different from the first color by modifying the glass batch with respect to at least one element or compound. The second color associated with the second glass composition is defined by a second color specification. In addition, a compensating agent is introduced into the molten glass separate from, and downstream of, the glass batch so that molten glass exiting the furnace continues to meet either the first color specification or the second color specification while the molten glass in the furnace is transitioning from the first glass composition to the second glass composition. At least one of the composition or color, or both, of the molten glass in the furnace is monitored during the transition of the molten glass from the first glass composition to the second glass composition.

In accordance with another aspect of the disclosure, there is provided a method for manufacturing glass that includes melting a glass batch in a continuous glass furnace to produce molten glass having a first color, transitioning the molten glass in the furnace from the first color to a second color by introducing, eliminating, or modifying an amount of at least one colorant material in the glass batch. A compensating agent is introduced into the molten glass flowing through the furnace separate from, and downstream of, the glass batch during the transition of the molten glass from the first color to the second color. The compensating agent is introduced into the molten glass in an amount that maintains a target color specification in molten glass being discharged from the furnace.

In accordance with another aspect of the disclosure, there is provided a method for manufacturing glass that includes melting a glass batch in a melting tank of a continuous glass furnace to produce molten glass having a first color, and directing the molten glass from the melting tank into a forehearth of the furnace. The molten glass in the melting tank is transitioned from the first color to a second color by modifying the glass batch with respect to at least one element or compound. A compensating agent is introduced into the molten glass in the forehearth during the transition of the molten glass in the melting tank from the first color to the second color to achieve a target color specification in the molten glass being discharged from the forehearth. The introduction of the compensating agent into the molten glass in the forehearth is adjusted to maintain the color of the molten glass being discharged from the forehearth at the target color specification during the transitioning of the molten glass in the melting tank from the first color to the second color.

BRIEF DESCRIPTION OF THE DRAWINGS

The disclosure, together with additional objects, features, advantages and aspects thereof, will be best understood from the following description, the appended claims and the accompanying drawings, in which:

FIG. 1 is a schematic illustration of a glass furnace including a feedback control system for effecting a full furnace color change in accordance with the present disclosure.

DETAILED DESCRIPTION

Disclosed is a method of manufacturing glass in a continuous glass furnace in which a compensating agent is employed during a full furnace color change to minimize or eliminate production down time and the generation of out-of-color specification glass, sometimes called transitional glass/cullet. A glass batch that includes a mixture of glass forming materials is continuously charged into a melting tank located at an upstream end of the glass furnace and melted therein to produce molten glass having a first color and a first glass composition. The as-produced molten glass gradually flows through the melting tank and is directed into a forehearth located at a downstream end of the glass furnace.

During the full furnace color change, all of the molten glass in the furnace and, at the very least, the melting tank, is gradually transitioned from the first color to a second color different from the first color, which means also transitioning the molten glass from the first glass composition to a second glass composition different from the first glass composition or adjusting the chemistry of the glass. To initiate the color change, the formulation of the glass batch is changed or modified with respect to at least one constituent of the batch to shift the composition and/or chemistry of the glass. Modification of the glass batch at the start of the changeover from the first color to the second color may include adding, eliminating, or modifying an amount of at least one colorant material in the glass batch. This stepwise change in the glass batch formulation gradually transitions the overall color of the molten glass in the furnace from the first color and first glass composition to the second color (and also typically to a second glass composition) as more and more glass at the first color is discharged from the furnace and replaced with more of the newly-formulated glass. To that end, the molten glass in the furnace and, in particular, the melting tank, may comprise a transitional color having a transitional composition (if the composition of the molten glass also changes) during the transition of the glass from the first color to the second color as the effects of the glass batch modification are realized. The transitional color and composition (if applicable) of the molten glass changes, with respect to time, as it responds to the modification of the glass batch that has been implemented to shift the color and composition of the glass from the old specification to the new one. In the description that follows, the color change will be discussed in terms of transitioning the molten glass from a first color having a first composition to a second color having a second composition for illustrative purposes.

The compensating agent is introduced into the molten glass in the furnace at a location between the upstream end and the downstream end of the furnace during the color change to achieve a target color specification in the glass exiting the furnace. For example, the compensating agent may be introduced into the molten glass flowing from the refining chamber into the forehearth or into the molten glass already in the forehearth. The compensating agent is formulated to make up for the out-of-color specification glass that would otherwise be generated in the furnace during the changeover from the first color to the second color by adjusting the composition and/or chemistry of the molten glass being discharged from the furnace so that the exiting molten glass satisfies the target color specification. This may mean that the compensating agent is formulated to ensure the molten glass in the forehearth satisfies the color specification of the first or the second color prior to discharge, even though the color and composition of the molten glass within and exiting the melting tank may not coincide with the first color and first glass composition or the second color and second glass composition, respectively, due to the dynamic nature of the transitional color and composition of the molten glass being produced during the color change. The volume of molten glass in the forehearth is generally much smaller than the volume of molten glass held within the melting tank, and thus the compensating agent can be incorporated into substantially all of the molten glass in the forehearth in a relatively short period of time, as compared to the time required to effect such a change in the melting tank.

The compensating agent is typically only applied to the molten glass in the furnace for a limited duration while the molten glass in the melting tank is transitioning from the first color having the first glass composition to the second color having the second glass composition. After all of the molten glass in the melting tank has transitioned from the first color to the second color, the addition of the compensating agent may no longer be necessary as the color can be maintained by the change to the glass batch that shifted the color and composition of the glass to the second color and the second glass composition. To determine whether the addition of the compensating agent should be continued or stopped, the color and/or the composition of the glass exiting the annealing lehr may be monitored, either continuously or periodically, during that same time via suitable analytical techniques. Alternately, the color and/or composition of the molten glass entering the forehearth may be monitored, either continuously or periodically. For example, the color and/or composition of the molten glass entering the forehearth or the color and/or composition of the glass exiting the annealing lehr may be monitored during the transition via a sensor designed for this purpose. Although the glass could be monitored at either of these points in the process, in practice, monitoring the glass exiting the lehr is the preferred process. In addition, a theoretical dilution curve can be generated to predict the time course of a transition from the first color to the second color and then measured values of actual samples can be compared to the predicted values to gauge the time to complete transition.

When all of the glass at the first color and first composition has been discharged from the melting tank and all of the molten glass entering the forehearth or the glass exiting the annealing lehr conforms to the color specification of the second color and is at the second glass composition, the addition of the compensating agent may be stopped. The amount of time required to transition all of the molten glass in the melting tank from the first color to the second color may vary and will generally depend upon the size of the tank and the rate at which molten glass is being discharged therefrom.

In some instances, to complete the color change, a relatively small amount of out-of-color specification glass may need to be flushed from the forehearth of the furnace after all of the molten glass in the melting tank has transitioned from the first color to the second color. In addition, if the furnace is only equipped with one forehearth, glass production may need to be stopped while the remaining out-of-color specification glass is flushed from the furnace. The full furnace color change is complete when all of the glass at the first color and the first glass composition has been discharged from the furnace and all of the molten glass remaining in the furnace is that of the second color and the second glass composition.

In general, the duration of production down time and the amount of out-of-color specification glass produced during the full furnace color change will depend upon the size of the furnace, and, more specifically, the size of the forehearth. For example, when the presently disclosed color change method is employed in a conventional glass furnace, it can significantly reduce the time required to complete a color change. For example, a full furnace color change from a nearly colorless flint glass to a blue colored glass using conventional procedures would normally require 12 to 24 hours. Using the disclosed process, the change over time can be reduced to 2 to 4 hours, which is only 1/6 the normal time. Likewise a transition from a blue glass to a nearly colorless flint glass may require 8.5 days for a conventional full furnace changeover. Using the present process this changeover time can be reduced to 2 to 4 days.

The glass batch charged into the melting tank may comprise a mixture of glass-forming materials and additive materials. The glass-forming materials may account for greater than 90 wt % of the glass batch and may include a combination of materials that can be melted together to produce a silica ($SiO_2$)-based glass composition, such as a soda-lime-silica glass. For example, the glass-forming materials in the glass batch may be formulated to produce a glass composition that includes greater than 50 wt. %, preferably greater than 70 wt. % $SiO_2$. In one specific example, the glass-forming materials in the glass batch may be formulated to produce a soda-lime glass composition including: 60-80 wt %, more preferably 71-74 wt % $SiO_2$; 8-18 wt %, more preferably 12-15 wt % $Na_2O$; 5-15 wt %, more preferably 9-13 wt % CaO; 0-3 wt %, more preferably 0.9-1.5 wt % $Al_2O_3$; and minor amounts of MgO and $K_2O$, each in the range of 0 to 2 wt %, more preferably less than 1 wt %. In such case, the glass-forming materials in the glass batch may comprise a combination of silicon (Si), sodium (Na), calcium (Ca), aluminum (Al), magnesium (Mg), and/or potassium (K)-containing materials. Such materials may be present in elemental form or compound form, e.g., oxide form. Some examples of traditional glass-forming materials include sand ($SiO_2$), soda ash ($Na_2CO_3$), limestone ($CaCO_3$), and cullet. The additional additive materials may account for less than 8 wt %, more preferably 5 wt % or less of the glass batch and may include a mixture of colorant materials, oxidizing agents, reducing agents, and/or fining agents.

One or more colorant materials optionally may be included in the glass batch to impart color, decolorize, or modify one or more optical properties of the resulting glass, such as the infrared and/or ultraviolet light absorbing properties of the glass. Some examples of suitable colorant materials include materials that contain iron (Fe), manganese (Mn), chromium (Cr), vanadium (V), copper (Cu), cobalt (Co), nickel (Ni), titanium (Ti), molybdenum (Mo), cerium (Ce), selenium (Se), phosphorus (P), silver (Ag), gold (Au), tin (Sn), erbium (Er), samarium (Sm), neodymium (Nd), and/or sulfur (S). Such materials may be present in the glass batch in elemental form or compound form, e.g., oxide form. Some colorant materials may additionally function as oxidizing agents, reducing agents, and/or fining agents.

One or more oxidizing and/or reducing agents optionally may be included in the glass batch to control the oxidation-reduction potential of the resulting glass, which may indirectly affect the color of the resulting glass. Some examples of suitable oxidizing agents include calcium sulfate ($CaSO_4$), sodium sulfate ($Na_2SO_4$), cerium oxide ($CeO_2$), manganese dioxide ($MnO_2$), sodium nitrate ($NaNO_3$ and potassium nitrate ($KNO_3$). The sodium and potassium nitrates are used less often to reduce NOx emissions. Some examples of suitable reducing agents include iron pyrite ($FeS_2$), iron chromite ($FeCr_2O_4$), sulfide sulfur (e.g., as ferrous sulfide, FeS), and most preferably carbon (C)-containing materials (e.g., coke, charcoal, sea coal, and sawdust). Some oxidizing and/or reducing agents in the glass batch may additionally function as a colorant material and/or a fining agent.

One or more fining agents optionally may be included in the glass batch to increase the rate at which gas bubbles are released from the molten glass. Gas bubbles may be generated in the molten glass during the decomposition of one or more of the glass-forming materials in the glass batch. Some examples of fining agents include oxides of arsenic (As), antimony (Sb), tin (Sn) and cerium (Ce), metal halides (e.g., metal fluorides, chlorides and bromides, such as sodium chloride (NaCl)), and metal sulfates (e.g., sodium sulfate ($Na_2SO_4$)). Most preferred are tin, cerium, and metal sulfates. Some fining agents in the glass batch may additionally function as an oxidizing or reducing agent and/or a colorant material.

Changing the color of the molten glass in the furnace from the first color, which is dictated by the first glass composition, to the second color, which is dictated by the second glass composition, is initiated by the selective addition, elimination, or modification of one or more components of the glass batch, i.e., one or more of the glass-forming materials or additive materials. For example, a colorant material may be added to the glass batch, eliminated from the glass batch, or modified in the glass batch to change one or more optical properties of the glass, such as the color and/or the infrared and/or ultraviolet light absorbing properties of the glass. Additionally, or alternatively, an oxidizing or reducing agent may be added to the glass batch, eliminated from the glass batch, or modified in the glass batch to change the oxidation state of one or more coloring ions in the resulting glass.

The first and second colors of glass produced in the furnace may be colorless or colored. In any case, the first glass composition associated with the first color may have a different chemical composition than that of the second glass composition associated with the second color. In some embodiments, the first color may be a colorless glass and the second color may be a colored glass. Because the perceived color of a glass falls on a spectrum, it is common in the industry for a glass manufacturer to assign a color specification to each of the various colors (including colorless) of glass it produces. The color specification may be one or a combination of several color related parameters such as % transmittance, dominant wavelength, brightness, and purity, all of which can be measured using standard procedures to maintain glass color consistency. Indeed, to determine when the transition from one color to another color is completed in accordance with the present disclosure, the color of glass objects may be monitored as they exit the annealing lehr. One acceptable process for monitoring the glass color is ASTM #1164. The color specification may also be defined by a "color space," which assigns numerical x, y, and z values in a three-dimensional integer space as a way to calculate and express color on a consistent basis for a given illuminant, supplementary standard observer, assumed transmission after reflection losses when measured in a defined medium, and sample thickness.

One or more colorant materials may be added to the glass batch to transition the molten glass in the furnace from the first colorless glass to the second colored glass, which may include up to 7.5 wt % coloring ions. The coloring ions in the colored glass may be present in elemental, oxide, sulfide, and/or selenide form. As the molten glass in the melting tank is transitioning from the first color (colorless) to the second color (colored), a compensating agent is introduced into the molten glass in the forehearth. The compensating agent may be formulated to adjust the composition and/or chemistry of the molten glass in the forehearth so that the molten glass exiting the forehearth meets the color specification of the second color, even though the molten glass in the melting tank being fed to the forehearth may be at a transitional color and composition, until the color transition in the melting tank is complete. This localized color adjustment may prevent the undesirable generation of out-of-color specification glass during the transition and also may allow for the color change to take effect in a relatively short period of time.

Alternatively, the compensating agent may be formulated to adjust the composition and/or chemistry of the molten glass in the forehearth so that the molten glass exiting the forehearth meets the color specification of the first color, even though the molten glass in the melting tank being fed to the forehearth may be at a transitional color and composition, until the color transition in the melting tank is complete. In such case, the molten glass may need to be flushed from the forehearth before the molten glass having the second color is delivered from the melting tank into the forehearth. In some cases, the compensating agent may be formulated to adjust the composition and/or chemistry of the molten glass in the forehearth to achieve a color and a glass composition that is different from the first color and the first glass composition as well as the second color and the second glass composition during the transition.

In one specific example, the first color may be a flint glass and the second color may be an emerald green glass. A typical emerald green glass has a composition including 0.001-0.4 wt. % $Cr_2O_3$ (or more narrowly 0.01-0.35 wt. % $Cr_2O_3$), 0.01-0.6 wt. % $Fe_2O_3$ (or more narrowly 0.01-0.4 wt. % $Fe_2O_3$), and 0.05-0.2 wt. % $SO_3$, in addition to the components of the soda-lime-silica glass composition as set forth above. The glass batch may initially include a mixture of glass-forming materials and a reducing agent. To initiate the color change, emerald green colorant materials, e.g., chromium, iron, and sulfur-containing materials, may be added to the glass batch. The compensating agent introduced into the molten glass in the forehearth during the transition from the first color (flint) to the second color (emerald green) also may include an amount of emerald green colorant materials (e.g., $Cr_2O_3$, $Fe_2O_3$, and $SO_3$) so that the molten glass exiting the forehearth meets the color specification of the second color, even though the molten glass in the melting tank being fed to the forehearth may be at a transitional color and composition, until the color transition in the melting tank is complete. In such case, the amount of the emerald green colorant materials in the compensating agent may gradually decrease during the transition and may be inversely proportional to the amount of $Cr_2O_3$, $Fe_2O_3$, and $SO_3$ in the molten glass that is being delivered from the melting tank into the forehearth. As the concentration of $Cr_2O_3$, $Fe_2O_3$, and $SO_3$ gradually increases in the molten glass in melting tank, the amount of emerald green colorant materials applied to the molten glass in the forehearth via the compensating agent may gradually decrease so that the molten glass discharged from the furnace both during and after the transition includes an appropriate amount of $Cr_2O_3$, $Fe_2O_3$, and $SO_3$.

In other embodiments, the first color may be a colored glass, and the second color may be a flint glass. In such case, one or more colorant materials may be eliminated from the glass batch to transition the molten glass in the furnace from the first color (colored) to the second color (flint), which may include 0 to less than 8 wt % coloring ions. As the molten glass in the melting tank is transitioning from the first color to the second color, a compensating agent is introduced into the molten glass in the forehearth. The compensating agent may be formulated to adjust the composition and/or chemistry of, and to decolorize, the molten glass in the forehearth so that the molten glass exiting the forehearth meets the color specification of the first color, even though the molten glass in the melting tank being fed to the forehearth may be at a transitional color and composition, until the color transition in the melting tank is complete. In such case, the molten glass may need to be flushed from the forehearth before the molten glass having the second color is delivered from the melting tank into the forehearth.

In one specific example, the first color may be an emerald green glass or a cobalt blue glass and the second color may be a flint glass. In such case, the glass batch may initially include a mixture of glass-forming materials and one or more colorant materials. A typical emerald green glass composition is set forth above and a typical cobalt blue glass composition may include 0.0005-0.2 wt % or, more narrowly, 0.01-0.15 wt. % CoO, in addition to the components of the soda-lime-silica glass composition as set forth above. To initiate the color change, any and all chromium, cobalt, and/or iron-containing colorant materials may be eliminated from the glass batch. The compensating agent introduced into the molten glass in the forehearth during the transition may be formulated to adjust the composition and/or chemistry of the molten glass in the forehearth so that the molten glass exiting the forehearth meets the color specification of the first color, even though the molten glass in the melting tank being fed to the forehearth may be at a transitional color and composition, until the color transition in the melting tank is complete. In such case, the compensating agent introduced into the molten glass in the forehearth may include a chromium, iron, and/or cobalt-containing colorant material, and the amount of the compensating agent applied to the molten glass in the forehearth may gradually increase during the transition until the color change in the melting tank is complete.

Alternatively, the compensating agent introduced into the molten glass in the forehearth during the transition may be formulated to adjust the composition and/or chemistry of the molten glass exiting the forehearth to decolorize the molten glass such that the molten glass in the forehearth meets the color specification of the second color, even though the molten glass in the melting tank being fed to the forehearth may be at a transitional color and composition, until the color transition in the melting tank is complete. In such case, the compensating agent may include known decolorizers such as erbium, selenium, cobalt, manganese, or cerium in elemental form or as an oxide or carbonate. In addition, both oxidizing or reducing agents can be used to affect color change. The amount of the decolorizing material applied to the molten glass in the forehearth via the compensating agent during the transition may gradually decrease during the transition until the color change in the melting tank is complete. The decolorizing material may be applied to the molten glass in the forehearth in an amount constituting 5 wt % or less of the molten glass.

In one embodiment, both the first and second colors may be colored glass. In such case, one or more colorant materials may be eliminated from the glass batch and one or more colorant materials may be added to the glass batch to initiate the transition from the first color to the second color. The compensating agent introduced into the molten glass in the forehearth during the transition may be formulated to adjust the composition and/or chemistry of the molten glass in the forehearth so that the molten glass exiting the forehearth meets the color specification of the first color or the color specification of the second color, even though the molten glass in the melting tank being fed to the forehearth may be at a transitional color and composition, until the color transition in the melting tank is complete. In either case, the forehearth may be flushed to complete the color change.

In one specific example, the first color may be an emerald green glass and the second color may be an amber glass. A typical emerald green glass composition is set forth above and a typical amber glass composition may include 0.05-0.6 wt. % $Fe_2O_3$, more preferably 0.3-0.5 wt % $Fe_2O_3$, and 0.02-0.12 wt. % $SO_3$, more preferably 0.04-0.08 wt % $SO_3$, in addition to the components of the soda-lime-silica glass composition as set forth above. The glass batch may initially include a mixture of glass-forming materials, one or more colorant materials, and a reducing agent. To initiate the color change, a chromium-containing colorant material may be eliminated from the glass batch and, in some instances, the amount of iron and/or sulfur-containing materials may be increased in the glass batch. The compensating agent introduced into the molten glass in the forehearth during the transition may be formulated to adjust the composition and/or chemistry of the molten glass in the forehearth so that the molten glass exiting the forehearth meets the color specification of the first color, even though the molten glass in the melting tank being fed to the forehearth may be at a transitional color and composition, until the color transition in the melting tank is complete. In such case, the compensating agent may include a chromium-containing colorant material. The amount of chromium applied to the molten glass in the forehearth via the compensating agent may gradually increase during the transition until the color change in the melting tank is complete. Alternatively, the compensating agent introduced into the molten glass in the forehearth during the transition may be formulated to adjust the composition and/or chemistry of the molten glass in the forehearth so that the molten glass exiting the forehearth meets the color specification of the second color. In such case, the compensating agent may include $Fe_2O_3$ and/or $SO_3$, and the amount of the compensating agent applied to the molten glass in the forehearth may gradually decrease during the transition until the color change in the melting tank is complete.

In another embodiment, both the first and second glass colors may be the same color. For example, the first color may be a flint glass and the second color may be a colorless infrared and/or ultraviolet light absorbing glass. Thus, the present disclosure can be used to transition from one color having a glass composition to the same color having a different glass composition, even if there is no apparent or actual color change in the glass. A colorless infrared light absorbing glass composition may be formulated to absorb certain wavelengths of infrared (IR) light (i.e., light having wavelengths somewhere within the range of about 780 nm to 1 mm), and an ultraviolet light absorbing glass composition may be formulated to absorb certain wavelengths of ultraviolet (UV) light (i.e., light having wavelengths somewhere within the range of about 10 nm to 380 nm). A typical colorless IR-absorbing glass composition may include, for example, 0.1 to 5 wt % $Dy_2O_3$, in addition to the components of the soda-lime-silica glass composition as set forth above. A typical colorless UV-absorbing glass composition may include, for example, 0.1 to 5 wt % $CeO_2$, in addition to the components of the soda-lime-silica glass composition as set forth above. To initiate the transition from the first color to the second color, one or more colorant materials, oxidizing agents, and/or reducing agents may be added to, eliminated from, or modified in the glass batch. The compensating agent introduced into the molten glass in the forehearth during the transition may be formulated to adjust the composition of the molten glass in the forehearth so that the molten glass exiting the forehearth meets the color specification or the composition, for example the IR absorbing or UV absorbing composition, of the first or second color.

FIG. 1 illustrates an apparatus 10 for the continuous production of molten glass in accordance with one embodiment of the present disclosure. The apparatus 10 includes a continuous glass furnace 12 and a feedback control system 14 for effecting a full furnace color change, as described above, in which the molten glass in the furnace 12 is transitioned from a first color to a second color. The furnace 12 illustrated in FIG. 1 includes a batch charging station 16, a melting tank 18, and a forehearth 20 downstream of the melting tank 18. Glass batch materials are charged into and melted in the melting tank 18 at an upstream end of the furnace 12, and molten glass is discharged from the forehearth 20 at a downstream end of the furnace 12. Although the presently disclosed color change process will be described herein in connection with the continuous glass furnace 12 illustrated in FIG. 1, it will be understood that its use is not limited to any specific type of furnace configuration.

The batch charging station 16 includes a batch charger 22 that continuously supplies a controlled amount of glass batch into the melting tank 18. The batch charger 22 may comprise a screw conveyor (as shown) driven by a motor 23 or a pusher-type device. The glass batch may be supplied to the batch charger 22 via a set of first and second hoppers 24, 26. In such case, the first hopper 24 may supply a mixture of glass-forming materials to the batch charger 22 and the second hopper 26 may supply one or more additive materials to the batch charger 22. The glass-forming materials and the one or more additive materials may be homogenously mixed together in the batch charger 22 prior to being introduced into the melting tank 18. Each of the hoppers 24, 26 may include a control valve 28, 30 for regulating the respective amounts of glass-forming materials and additive materials supplied to the batch charger 22. In other embodiments, the glass batch may be supplied to the batch charger 22 via a single hopper, and the glass-forming materials and optional additive materials may be mixed together in appropriate amounts prior to being delivered to the hopper (not shown).

The melting tank 18 includes an upstream or front wall 32 and a downstream or rear wall 34, and further defines a melting chamber 36 and a refining chamber 38 positioned downstream of the melting chamber 36. Glass batch is supplied to the melting tank 18 and, in particular, the melting chamber 36 via an inlet opening 40 in the front wall 32 of the tank 18, and molten glass is discharged from the tank 18, more specifically from the refining chamber 38, via an outlet opening 42 in the rear wall 34 of the tank 18. The melting chamber 36 and the refining chamber 38 are separated from each other by a submerged passageway 44, which as shown here may be partially defined by a bridge wall 46, and molten glass is allowed to flow from the melting chamber 36 into the refining chamber 38 of the tank 18 through the submerged passageway 46. Heat may be supplied to the glass batch and the molten glass in the melting tank 18 via one or more overhead burners 48 and/or by one or more other suitable sources of heat, e.g., submerged electrodes and/or submerged combustion burners.

Melted and refined molten glass is received at an upstream end of the forehearth 20 via the outlet opening 42 in the rear wall 34 of the tank 18 or through a forehearth alcove, and molten glass is discharged from a downstream end of the forehearth 20 via a feeder spout 50, which delivers gobs of the molten glass to one or more glass forming operations (not shown). The upstream end of the forehearth 20 is configured to receive a compensating agent and to homogenously disperse the compensating agent into the molten glass flowing through the forehearth 20 prior to discharge. The compensating agent may be introduced into an upstream end of the forehearth 20—the "upstream end" extending from an entrance of the forehearth 20 in the direction of flow to 50% of the length of the forehearth 20—via a conduit 52 that extends into an interior of the forehearth 20, above a free surface of the molten glass in the forehearth. The compensating agent may be supplied to the conduit 52 from a hopper 54, which may include a control valve 56 for regulating the amount of the compensating agent that is supplied from the hopper 54, through the conduit 52, and into the molten glass in the forehearth 20. As discussed, the compensating agent can comprise a colorant enriched material or color concentrate, such as a frit glass or pressed pellets when the color is being changed from a first color to a second color. Alternatively, the compensating agent could be a decolorizing agent and may be in form of a frit glass or pressed pellets having the decolorizer therein. One or more stirrers 58 may be positioned in the molten glass in the forehearth 20 to help mix the compensating agent into the molten glass prior to discharge.

A gate 60 may be positioned at the downstream end of the melting tank 18 to prevent the flow of molten glass from the outlet opening 42 of the tank 18 into the forehearth 20 or a forehearth alcove, for example, so that the molten glass in the forehearth 20 can be flushed separately from the molten glass in the melting tank 18. The gate 60 may be controlled to move from an open position to a closed position, and back, via a motor 61. When the gate 60 is in the open position, molten glass can freely flow from the melting tank 18 into the forehearth 20. When the gate 60 is in the closed position (dashed lines), the outlet opening 42 of the melting tank 18 is blocked by the gate 60 and the flow of molten glass from the melting tank 18 into the forehearth 20 is prevented.

The feedback control system 14 may be used to initiate and automate a change in the composition and color of the molten glass in furnace 12. In the embodiment illustrated in FIG. 1, the feedback control system 14 includes an interface 62, a controller 64, a color or composition sensor 66, a flow sensor 68, and a plurality of actuators 70, 72, 74. Communication between the interface 62, controller 64, composition sensor 66, flow sensor 68, and actuators 70, 72, 74 is established by a plurality of wired or wireless signal lines 76.

The interface 62 receives set point information, for example, from an operator. The set point information may include target color specification data for the molten glass in the furnace 12, which is relayed from the interface 62 to the controller 64. The composition sensor 66 receives information regarding the color and/or composition of the molten glass in the furnace 12 from lead 65 or the color of the glass from a separate location, such as a lehr (not shown), as indicated by the second lead 67, and transmits the information to the controller 64. The flow sensor 68 receives information regarding the pull rate (or flow rate) of molten glass through the forehearth 20 and transmits the information to the controller 64. The actuators 70, 72, 74 are configured to open and close the control valves 28, 30, 56 on the hoppers 24, 26, 54, respectively, in response to control signals from the controller 64.

The composition sensor 66 may comprise any device that is capable of receiving information regarding the color and/or composition of the molten glass in the furnace 12, or the color of the glass from another location, and transmitting the information to the controller 64. For example, the composition sensor 66 may be an optical sensor (e.g., a spectrometer) and may be configured to determine the color and/or chemical composition of the molten glass in the furnace 12 or the color of glass at another location. As another example, the composition sensor 66 may receive information regarding the color and/or composition of the molten glass in the furnace 12 from an analyzer outside the furnace 12, wherein a sample of molten glass may need to be withdrawn from a desired location within the furnace 12 and delivered to the analyzer for analysis and then the analysis is sent to the composition sensor 66. Alternatively, the composition sensor 66 may monitor the color of glass as it exits an annealing lehr, not shown, which also happens to be the same color as the molten glass exiting the forehearth 20, and send this information to the controller 64 via lead 67.

The composition sensor 66 shown in FIG. 1 is configured to receive information regarding the color and/or composition of the molten glass passing from the outlet opening 42 of the melting tank 18 and headed into the forehearth 20. In other embodiments, the composition sensor 66 may be configured to receive information regarding the color and/or composition of the molten glass in a different region of the furnace 12 or as described above it can be located to detect the color of glass as it exits the annealing lehr, which as mentioned above also corresponds to the color of the molten glass exiting the forehearth 20, or from other locations in the glass manufacturing facility.

The flow sensor 68 may comprise any device that is capable of receiving information regarding the pull rate (or flow rate) of molten glass through the forehearth 20 and transmitting the information to the controller 64. For example, the flow sensor 68 may comprise one or more pressure sensors that gather information regarding the pressure within the molten glass at a known depth below the surface of the molten glass in the furnace 12. As another example, the flow sensor 68 may comprise one or more level sensors that gather information regarding the level of molten glass in the furnace 12. Alternatively, the pull rate can be determined and controlled by knowing and controlling the gob weight, the number of gobs, and the timing of gob cutting. In addition to the composition sensor 66 and the flow sensor 68, the feedback control system 14 may include one or more additional sensors for providing feedback to the controller 64 regarding the chemical and/or physical properties of the molten glass in the furnace 12 and/or the operating conditions of the furnace 12 itself.

A change in the color of the molten glass in the furnace 12 may be initiated at the interface 62, for example, by changing the target color specification for the molten glass. The controller 64 may carry out this change by sending control signals to one or both of the actuators 70, 72 to open, close, or change the position of the control valves 28, 30. In this way, the respective amounts of the glass-forming materials and additive materials in the glass batch can be selectively modified to effectively change the composition and color of the molten glass produced therefrom. As previously discussed, this stepwise change in the glass batch formulation will gradually change the overall color, and typically the composition, of the molten glass in the furnace 12. To compensate for this gradual change, a compensating agent is introduced into the molten glass in the forehearth 20 via the conduit 52 during the transition to rapidly adjust the composition and/or chemistry of the molten glass in the forehearth 20 downstream of the conduit 52 to bring that portion of the molten glass in the furnace 12 into conformance with the new target color specification prior to discharge.

As the molten glass in the furnace 12 gradually transitions from the first color to the second color, information regarding the color and/or composition of the molten glass at the outlet opening 42 of the tank 18 or from glass exiting the annealing lehr is received by the composition sensor 66, either directly or via a separate analysis as described above, and transmitted to the controller 64. In addition, information regarding the flow rate of the molten glass through the forehearth 20 is received by the flow sensor 68 and transmitted to the controller 64. Based upon the information received from the composition sensor 66 and the flow sensor 68, the controller 64 will send a control signal to the actuator 74 to open, close, or change the position of the control valve 56. In this way, the addition of the compensating agent in the forehearth 20 can be controlled by the controller 64 and the amount of the compensating agent applied to the molten glass in the forehearth 20 can be appropriately adjusted during the transition. For example, at the beginning of the transition, a relatively large amount of the compensating agent may need to be applied to the molten glass in the forehearth 20, but this amount may gradually decrease as the color change is gradually achieved, or vice versa. To ensure that an appropriate amount of the compensating agent is consistently being applied to the molten glass in the forehearth 20 during the transition, information regarding the color, composition, and/or flow rate of the molten glass in the furnace 12 can be continuously supplied to the controller 64 and used to continuously and accurately adjust the position of the control valve 56.

There thus has been disclosed a method and a system for effecting a full furnace color change in a continuous glass furnace that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of manufacturing glass comprising:
   melting a glass batch in a continuous glass furnace to produce molten glass having a first glass composition and a first color, the first color being defined by a first color specification;
   transitioning the molten glass in the furnace from the first glass composition to a second glass composition having a second color by modifying the glass batch with respect to at least one element or compound, the second color being defined by a second color specification;
   introducing a compensating agent into the molten glass separate from, and downstream of, the glass batch so that molten glass exiting the furnace continues to meet either the first color specification or the second color specification while the molten glass in the furnace is transitioning from the first glass composition to the second glass composition; and
   monitoring at least one of the composition or the color, or both, of the molten glass in the furnace during the transition of the molten glass from the first glass composition to the second glass composition.

2. The method set forth in claim 1, wherein the glass batch comprises a mixture of glass-forming materials.

3. The method set forth in claim 1, wherein the at least one element or compound comprises a colorant material.

4. The method set forth in claim 1, wherein the compensating agent is introduced into the molten glass in the form of frit glass.

5. The method set forth in claim 1, wherein the glass batch is melted in a melting tank of the furnace, and the compensating agent is introduced into the molten glass in a forehearth of the furnace positioned downstream of the melting tank.

6. The method set forth in claim 5, wherein the compensating agent is formulated to adjust the composition of the molten glass in the forehearth so that the molten glass being discharged from the furnace meets the first color specification of the first glass composition during the transition from the first glass composition to the second glass composition.

7. The method set forth in claim 5, wherein the compensating agent is formulated to adjust the composition of the molten glass in the forehearth so that the molten glass being discharged from the furnace meets the second color specification of the second glass composition during the transition from the first glass composition to the second glass composition.

8. The method set forth in claim 1, wherein transitioning the molten glass in the furnace from the first glass composition to the second glass composition includes introducing, eliminating, or modifying an amount of the at least one element or compound in the glass batch.

9. The method set forth in claim 8, wherein, during the transition from the first glass composition to the second glass composition, the compensating agent is introduced into the molten glass in an amount corresponding to the amount of the at least one element or compound that is introduced, eliminated, or modified in the glass batch.

10. A method of manufacturing glass comprising:
    melting a glass batch in a continuous glass furnace to produce molten glass having a first color;
    transitioning the molten glass in the furnace from the first color to a second color by introducing, eliminating, or modifying an amount of at least one colorant material in the glass batch; and
    introducing a compensating agent into the molten glass flowing through the furnace separate from, and downstream of, the glass batch during the transition of the molten glass from the first color to the second color, wherein the compensating agent is introduced into the molten glass in an amount that maintains a target color specification in molten glass being discharged from the furnace.

11. The method set forth in claim 10, wherein the furnace comprises a melting tank and a forehearth, the melting tank defining a melting chamber and a refining chamber separated by a submerged passageway and wherein the refining chamber is positioned downstream of the melting chamber, the method comprising melting the glass batch in the melting chamber of the melting tank and introducing the compensating agent into the refining chamber of the melting tank or the forehearth.

12. The method set forth in claim 11, wherein, once the molten glass in the melting tank achieves the second color, the method further comprises:

stopping the introduction of the compensating agent in the refining chamber or the forehearth;

preventing molten glass flow between the refining chamber and the forehearth of the furnace, and flushing the forehearth of the furnace.

13. The method set forth in claim 12, wherein, after the forehearth of the furnace has been flushed, the method further comprises:

directing molten glass having the second color to flow from the refining chamber of the melting tank into the forehearth of the furnace; and producing glass articles from the molten glass exiting the forehearth end of the furnace.

14. The method set forth in claim 11, comprising:

prior to the transition of the molten glass from the first color to the second color, discharging molten glass from the forehearth of the furnace and producing glass articles having the first color therefrom;

during the transition of the molten glass from the first color to the second color, discharging molten glass from the forehearth of the furnace and producing glass articles having a color corresponding to the target color specification; and after the transition of the molten glass from the first color to the second color, discharging molten glass from the forehearth of the furnace and producing glass articles having the second color.

15. The method set forth in claim 10, wherein transitioning the molten glass in the furnace from the first color to the second color includes introducing a colorant material into the glass batch, and, during the transition of the molten glass from the first color to the second color, the compensating agent comprises a corresponding amount of the same colorant material or a different colorant material.

16. The method set forth in claim 10, wherein transitioning the molten glass in the furnace from the first color to the second color includes eliminating a colorant material from the glass batch, and, during the transition of the molten glass from the first color to the second color, the compensating agent comprises a corresponding amount of the same colorant material or a different colorant material.

17. The method set forth in claim 16, wherein the compensating agent comprises a decolorizer.

18. A method of manufacturing glass comprising:

melting a glass batch in a melting tank of a continuous glass furnace to produce molten glass having a first color;

directing the molten glass from the melting tank into a forehearth;

transitioning the molten glass in the melting tank from the first color to a second color by modifying the glass batch with respect to at least one element or compound;

introducing a compensating agent into the molten glass in the forehearth during the transition of the molten glass in the melting tank from the first color to the second color to achieve a target color specification in molten glass being discharged from the forehearth; and adjusting the introduction of the compensating agent into the molten glass in the forehearth to maintain a color of the molten glass being discharged from the forehearth at the target color specification during the transitioning of the molten glass in the melting tank from the first color to the second color.

* * * * *